(12) United States Patent
McLellan

(10) Patent No.: US 7,685,609 B1
(45) Date of Patent: Mar. 23, 2010

(54) USING A DISTRIBUTED FORM OBJECT MODEL TO FACILITATE FORM EVENT PROCESSING

(75) Inventor: Keith R. McLellan, Ottawa (CA)

(73) Assignee: Adobe Systems, Incorporated, San Jose, CA (US)

( * ) Notice: Subject to any disclaimer, the term of this patent is extended or adjusted under 35 U.S.C. 154(b) by 1431 days.

(21) Appl. No.: 11/064,333

(22) Filed: Feb. 22, 2005

(51) Int. Cl.
*G06F 3/00* (2006.01)
*G06F 3/048* (2006.01)
(52) U.S. Cl. ........................................ 719/328; 715/769
(58) Field of Classification Search ................. 719/318, 719/328; 715/769
See application file for complete search history.

(56) References Cited

U.S. PATENT DOCUMENTS

| | | | |
|---|---|---|---|
| 4,651,288 A | 3/1987 | Zeising | |
| 5,047,960 A | 9/1991 | Sloan | |
| 5,704,029 A | 12/1997 | Wright, Jr. | |
| 5,953,523 A | 9/1999 | Martinez et al. | |
| 6,014,668 A | 1/2000 | Tabata et al. | |
| 6,084,585 A | 7/2000 | Kraft et al. | |
| 6,714,219 B2* | 3/2004 | Lindhorst et al. | 715/769 |
| 6,725,220 B2 | 4/2004 | Stratigos et al. | |
| 6,856,995 B1* | 2/2005 | Ibitayo et al. | 707/102 |
| 6,981,215 B1* | 12/2005 | Lindhorst et al. | 715/207 |
| 2002/0116473 A1* | 8/2002 | Gemmell | 709/219 |

* cited by examiner

*Primary Examiner*—Lechi Truong
(74) *Attorney, Agent, or Firm*—Robert C Kowert; Meyertons, Hood, Kivlin, Kowert & Goetzel, P.C.

(57) ABSTRACT

A system and method for facilitating distributed form processing is disclosed. The system ma deploy a form to both a client and a server, wherein the form is consistent with a common object model supported by both the client and the server. Scripts associated with the form may be marked to run on the client or on the server. When a script fires, if it is marked to run on the client, the script executes on the client. When the client fires a script marked to run on the server, the client sends the state of the form to the server, the server runs the script and returns the new state of the form to the client. The client updates the state of its form to reflect the changes made by the server.

10 Claims, 3 Drawing Sheets

USING A DISTRIBUTED FORM OBJECT MODEL TO FACILITATE FORM EVENT PROCESSING

BACKGROUND

1. Field of the Invention

The present invention relates to the design of form-based processing systems. More specifically, the present invention relates to a method and an apparatus for using a distributed form object model to facilitate distributed form event processing.

2. Related Art

Existing web applications typically operate by presenting a form to a user through a client, such as a web browser. This enables the user to interact with an underlying application in an intuitive manner by entering data into the form, and by triggering application functions through controls, such as buttons, located in the form. Execution of an application function associated with the form typically involves a number of interactions between intelligence on the client and intelligence on the application server.

In developing forms for web deployment, client-side intelligence is typically written to an object model and programming language supported by the client, and server-side intelligence on the application server is typically written to an object model and programming language supported by the server. This results in programming logic that differs for each supported client and for each supported application server. For example, a user wishing to deploy a form to an HTML browser typically writes Java™ script to the Dynamic HTML object model to produce the client-side intelligence. Whereas, the server-side intelligence associated with the form might be written to the programming model of a web server application, in a server-side programming language such as Java.

If a need arises to obtain information form the server, client-side intelligence has to be added to submit a request for the information to the server, and corresponding serve-side intelligence has to be added to service the request. This can be complicated because the client-side intelligence and the server-side intelligence are typically written to different object models by different groups of people using different programming languages. Hence, modifications to a form often have to be coordinated between client-side programmers are server-side programmers. This greatly complicates the tasks of developing and maintaining web applications.

Hence, what is needed is a method and an apparatus that facilitates developing and maintaining web applications without the complications described above.

SUMMARY

One embodiment of the present invention provides a system that facilitates distributed form processing. During operation, the system deploys a form to both a client and a server, wherein the form is consistent with a common form object model which is supported by both the client and the server, and wherein scripts associated with the form can be marked to run on the client or to run on the server. When a script associated with the form fires, if the script is marked to run on the client, the script executes on the client, and if the script is marked to run on the server, the script executes on the server.

In a variation on this embodiment, the form specifies client logic and server logic, as well as calls between the client logic and the server logic. In this way, a programmer can generate both the client logic and the server logic in a single form using a single object model, instead of having to generate the client logic and the server logic separately in using different object models.

In a variation on this embodiment, if an event occurs on the client and a corresponding script for the event is marked to run on the server, the client sends the event along with any associated data to the server for server-side execution.

In a further variation, the server-side version of the form is "stateless." Hence, upon receiving an event from the client, the server regenerates the form prior to server-side execution of a script associated with the event. (Note that the term state "stateless" refers to the fact that there is no form state left over from a prior invocation; the form is regenerated upon each invocation.)

In a further variation, after server-side execution completes, the server sends a response along with any associated data to the client, thereby allowing the client to merge changes into the client-side version of the form.

In a variation on this embodiment, deploying the form to the client involves using a form template to produce a client-specific rendering of the form.

In a further variation, the client-specific rendering of the form includes a return URL, which points to an application on the server for events to return to.

In a variation on this embodiment, if the server identifies an event that is marked to run on the client, the server inserts a corresponding script for the event into the client-specific rendering of the form so that the client can run the associated script.

DETAILED DESCRIPTION

Figure 1:
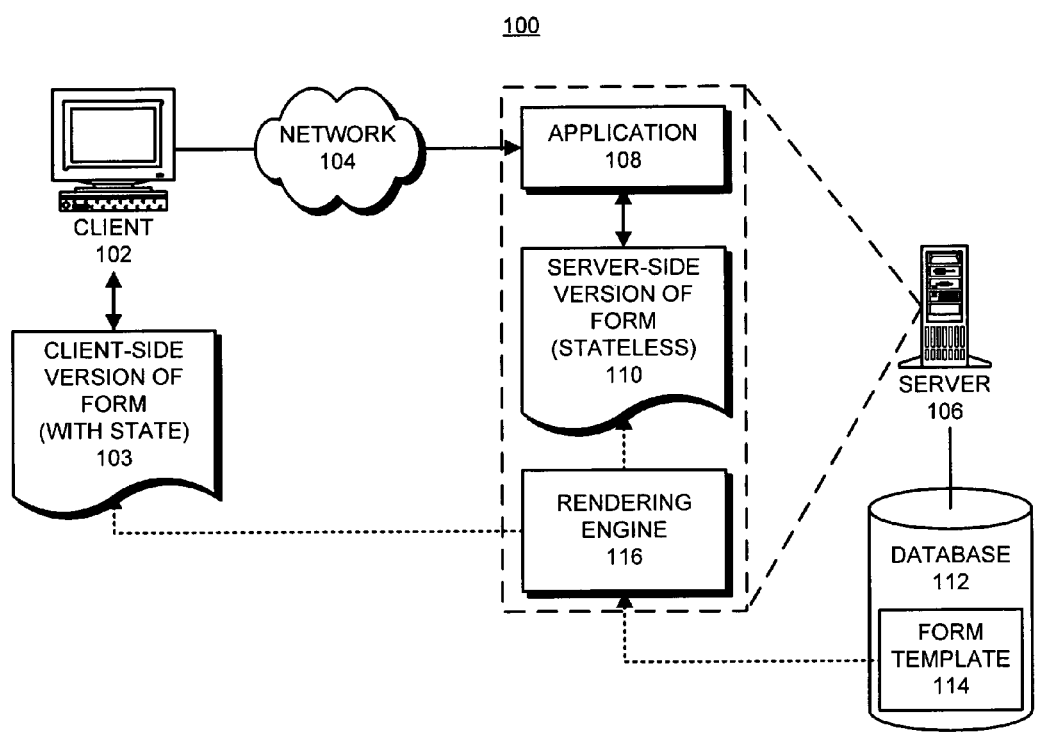
FIG. 1 illustrates a client-server system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Designing, Rendering and Using Forms

The present invention enables a developer to write form logic with a common object model that will run on both client and server, and also to facilitate distributed event processing. Hence, the present invention allows solution providers to support many combinations of intelligent form clients and servers without having the write different code for each type of client and server which is supported.

Note that a "form object model" includes data as well as information specifying how the form and associated data are to be presented. Furthermore, the term "distributed form processing" refers to the act of processing both data and presentation information in a distributed manner on different nodes (such as a client and a server) in a distributed computing system.

In one embodiment of the present invention, scripting intelligence can be added to a form template using an XML form designer. Scripts are designed to execute at different stages/activities of form processing. Examples include initializing, calculating, validating, entering a field, exiting a field, clicking a button. Moreover, the designer can specify whether a script is to execute on the client or the server.

When the template is loaded for execution on the server, events and/or calculations fire. For example, events can include: initialize, calculate, validate, and ready. The events that fire depend upon what processing action the server is currently performing, such as rendering, calculating, or processing submitted data.

During the form-rendering process, an application calls the server to merge the data and template and render to a specific client device. In this case, the object model is created on the server by merging data and template, calculation and events are run, and then the model is rendered into a format suitable for the target device.

Once the form is running on the client, the client can call the server to execute a particular event on the server. For example, when a button is clicked on the client, the client can send the event and the data to the server for server-side execution. Upon receiving the event, the server reads the template reference from the submitted data and merges the data into the template, thereby recreating the object model on the server. The server then executes the event and sends the response back to the client, which merges the changes back into the client form.

The client can also do a final submission to the server. This is similar to the normal submission (described above), but in this case the server finishes up by processing the submitted data. This involves: merging the data into the template; running any events; and returning the completed data to the application. The client is then finished.

The processes summarized above are described in more detail below.

Client-Server System

FIG. 1 illustrates a client-server system 100 in accordance with an embodiment of the present invention. This system includes a client 102, and a server 106, which communicate with each other through a network 104. Client 102 can include any node on a network including computational capability and including a mechanism for communicating across the network. Server 106 can include any computational node including a mechanism for servicing requests from a client for computational and/or data storage resources. In one embodiment of the present invention, server 106 hosts a web server and client 102 contains a web browser, which can be used to navigate through a web site provided by the web server. In another embodiment, client 102 is a client-side application, such as Adobe Acrobat™.

Network 104 can generally include any type of wired or wireless communication channel capable of coupling together computing nodes. This includes, but is not limited to, a local area network, a wide area network, or a combination of networks. In one embodiment of the present invention, network 104 includes the Internet.

Server 106 is coupled to a database 112, which can include any type of system or mechanism for storing data in volatile or non-volatile storage. This includes, but is not limited to, systems based upon magnetic, optical, and magneto-optical storage devices, as well as storage devices based on flash memory, battery-backed up memory and/or RAM memory.

Database 112 contains a form template 114, which can be used to generate a client-side version of a form 103 for client 102, and a server-side version of the form 110 for server 106. Template 114 can be loaded and merged with data to create an object model that can be realized on client 102 or server 106. In one embodiment of the present invention, form template 114 is an XML representation of a form that contains markup representing presentation, form UI elements and scripting. Form template 114 can be fed through rendering engine 116 so that it can be displayed and/or executed in a variety of client devices. In one embodiment of the present invention, the client-side version of the form includes state information, while the server-side version of the form is "stateless." This means that the server-side version of the form typically needs to be regenerated prior to server-side execution.

A form is typically associated with "scripting intelligence." This scripting intelligence can include scripts that execute based on events or calculations, and which can modify form data and form presentation so that the form interacts with the user in an intelligent manner. More specifically, in one embodiment of the present invention, the template defines widgets (such as buttons, text fields, drop down lists), events associated with widgets, and scripts that fire when specific events happen.

In one embodiment of the present invention, a form is written to a "common object model," which is supported by both client 102 and server 106, and which facilitates distributed event processing. Note that an "object model" specifies the design of an object, including the classes required to create and instance of the object by using methods, properties and events to interact with the object. In one embodiment of the present invention, the common object model is represented using a subset of the eXtensible Form Architecture (XFA) object model, which can be implemented on intelligent computers and/or devices using Java™ scripts. In this embodiment, the server-side version of this form 110 can be implemented using a server programming language, such as the Java™ programming language or C++, and the client-side version of this form 103 can be implemented in Java™ script so that it runs on all modern web browsers. Alternatively, the client-side (and possibly server-side) version of the form 103 can be implemented as a plug-in.

In one embodiment of the present invention, server 106 contains an application 108, which coordinates communications between client-side and server-side versions of a form, and which causes server-side and client-side versions of the form to be generated.

Form Deployment Process

Figure 2:
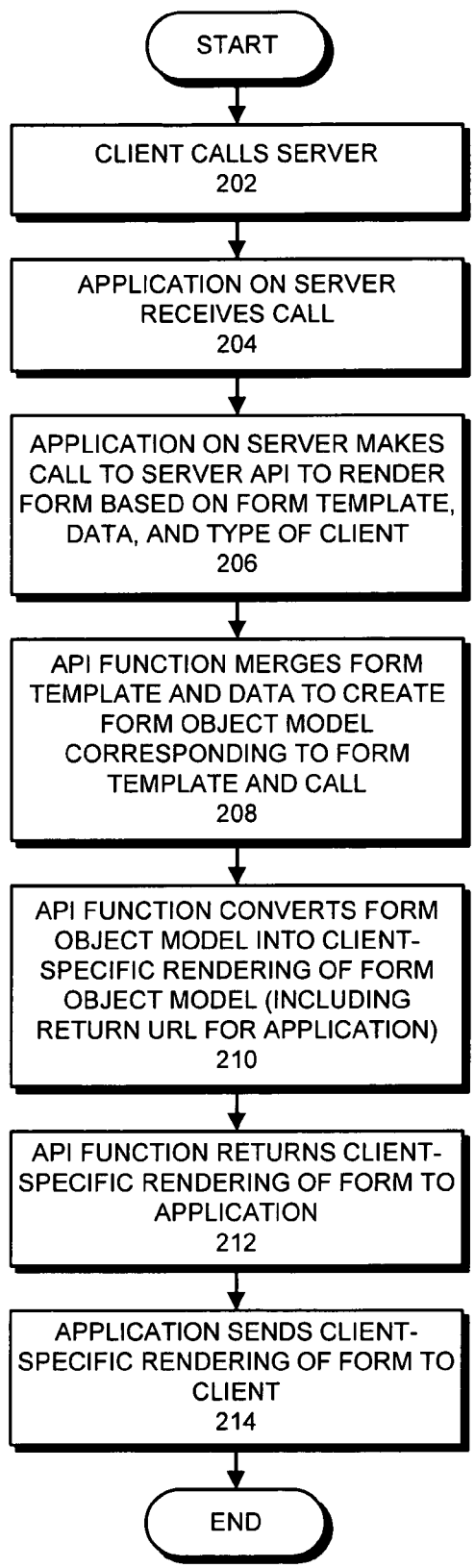
FIG. 2 presents a flow chart illustrating the form deployment process in accordance with an embodiment of the present invention.

FIG. 2 presents a flow chart illustrating the form deployment process in accordance with an embodiment of the present invention. The process starts when client 102 makes a call to server 106 (step 202). Upon receiving the call (step 204), application 108 on server 106 calls to a function defined in a server-side Application Programming Interface (API) to render the form (step 206). This call identifies a form template 114 and a type of client, and can also include other data received from the client 102. The API function merges the form template and the data to create a form object model corresponding to the specific form template and the specific call (step 208).

Next, the API function converts the form object model into a client-specific rendering of the form object model (step 210). For example, the form can be converted into HyperText Markup Language (HTML) for execution on a client browser. This client-specific rendering can include a return URL, which links back to the application 108. Finally, the API function returns to client-specific rendering to application 108 (step 212). Application 108 then sends the client-specific rendering of the form to client 102, so that the form can be loaded onto client 102.

When the client loads the form, the "runAt=client" scripts execute when the corresponding events occur. As the user interacts with the form, the script associated with the user actions fire. If the script is marked runAt=client, the scripts execute locally on the client. If the script is marked runat=server, the current state of the form is submitted to the server and the script is executed in the context of the server. After the server has executed the event, the state of the form is returned to the client. This process is described in more detail below.

Event Processing

Figure 3:
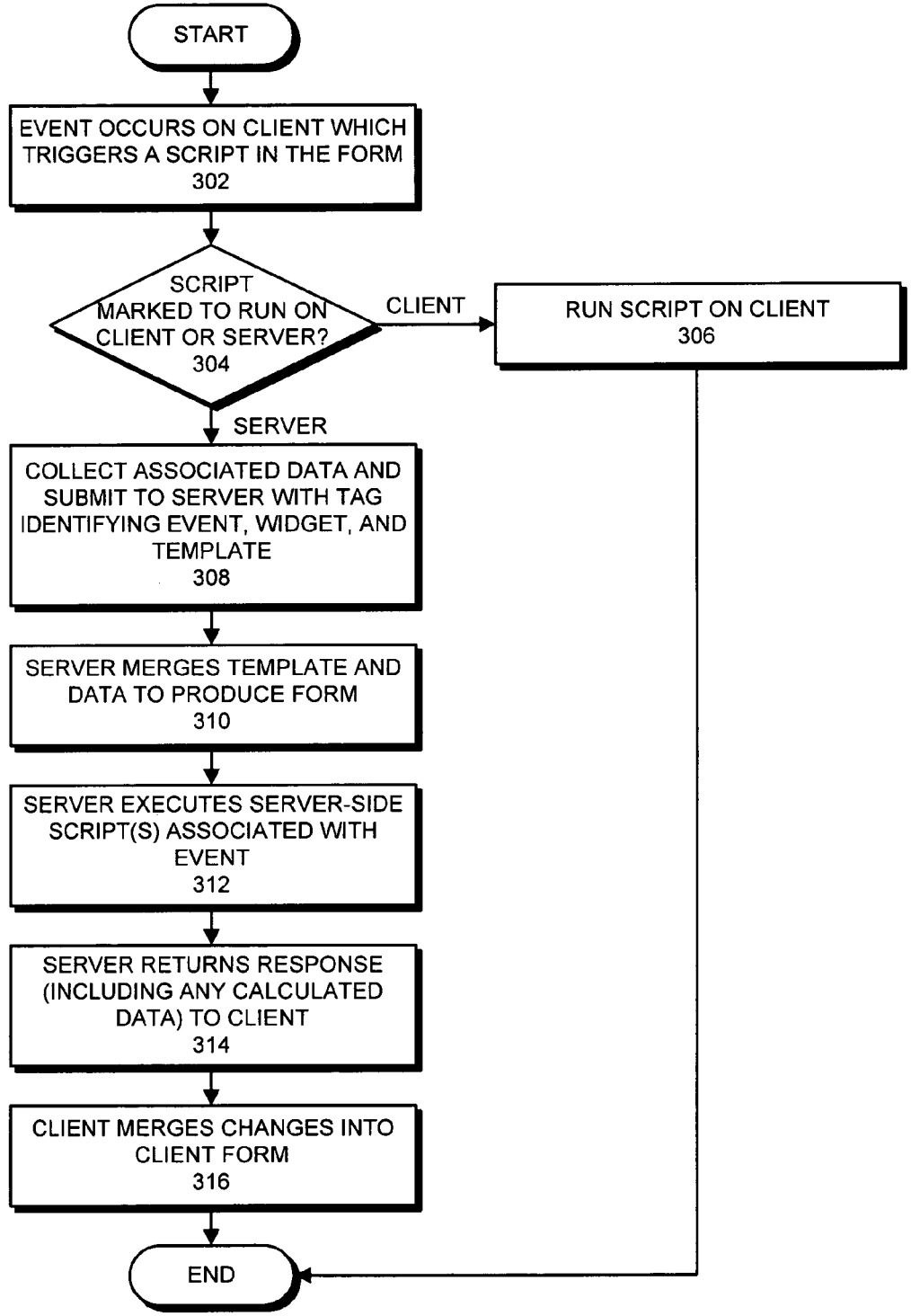
FIG. 3 presents a flow chart illustrating how an event on the client can trigger a script to run on the client or to run on the server in accordance with an embodiment of the present invention.

FIG. 3 presents a flow chart illustrating how an event on the client can trigger a script to run on the client or to run on the server in accordance with an embodiment of the present invention. The system starts with a client-side version of the form which is deployed on the client 102. Next, an event occurs on the client, which triggers a script in the form (step 302).

The system then determines whether the script is marked to run on client 102 or is marked to run on server 106 (step 304). (For example, form events that cause scripts to run on the server can include: initialize, enter, exit, validate, calculate, mouseEnter, mouseExit, docReady, docClose, change, full, mouseUp, mouseDown, click, and preSubmit.)

If the script is marked to run on client 102, the system runs the script on client 102 (step 306).

Otherwise, if the script is marked to run on server 106, the system collects data associated with the event into a request and submits the request to the server. This request includes the collected data as well as a tag which identifies, the event, the template, and possibly the associated widget (step 308). In response to the submission, application 108 on server 106 makes an API call to merge the template and the data to generate the form on the server (step 310). Note that in this variation of the present invention, the server side-version of the form is stateless, and is regenerated every time client 102 makes a request to run a server-side script.

Once the server-side version of the form is generated, server 106 can execute server-side scripts associated with the event (step 312).

Server 106 can then return a response (including any calculated data) to client 102 (step 314).

Client 102 then merges any changes into the client-side version of the form (step 316). At this point the process is complete.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating distributed form processing, comprising:

sending, by a computer-implemented server, a form to a computer-implemented client, wherein the form is consistent with a common object model which is supported by both the client and the server, and wherein the form is based on a template;

wherein the form specifies client logic and server logic including one or more scripts, each executable by either of the server or the client, as well as calls between the client logic and the server logic for invoking or receiving results from the one or more scripts, wherein a programmer can generate the client logic and the server logic in a single form using the common object model, instead of having to generate the client logic and the server logic separately using different object models;

wherein each script is marked in the form to be run on the client in response to a respective input event on the client or to be run on the server in response to the respective input event on the client, wherein a client-specific rendering of the form includes a return network location which points to an application on the server for events to return to;

receiving, by the server, an indication from the client of an input event on the client and of associated data, wherein a script of the one or more scripts is marked to run on the server in response to the input event;

in response to said receiving the indication: creating, by the server, a server-side instance of the form according to the common object model, the template, and the associated data;

executing, by the server, the script based on the server-side instance of the form, wherein executing the script results in one or more changes to the server-side instance of the form; and sending, by the server, to the client an indication of the one or more changes to the form, thereby allowing the client to merge the one or more changes from the server-side instance of the form into a client-side instance of the form.

2. The method of claim 1, wherein said sending the form to the client involves using the template to produce the client-specific rendering of the form.

3. The method of claim 2, wherein the client-specific rendering of the form includes a return URL, which specifies the network location and points to the application on the server for events to return to.

4. The method of claim 2, wherein the server inserts a script into the client-specific rendering of the form and marks the script to be run on the client in response a respective input event on the client.

5. A computer-readable storage medium storing instructions that when executed by a computer cause the computer to perform a method for facilitating distributed form processing, the method comprising:

a server sending a form to a client, wherein the form is consistent with a common object model which is supported by both the client and the server, and wherein the form is based on a template;

wherein the form specifies client logic and server logic including one or more scripts, each executable by either of the server or the client, as well as calls between the client logic and the server logic for invoking or receiving results from the one or more scripts, wherein a programmer can generate the client logic and the server logic in a single form using the common object model, instead of having to generate the client logic and the server logic separately using different object models;

wherein each script is marked in the form to be run on the client in response to a respective input event on the client or to be run on the server in response to the respective input event on the client, wherein a client-specific rendering of the form includes a return network location which points to an application on the server for events to return to;

the server receiving an indication from the client of an input event on the client and of associated data, wherein a script of the one or more scripts is marked to run on the server in response to the input event;

in response to said receiving the indication: the server creating a server-side instance of the form according to the common object model, the template, and the associated data;

the server executing the script based on the server-side instance of the form, wherein executing the script results in one or more changes to the server-side instance of the form; and the server sending to the client an indication of the one or more changes to the form, thereby allowing the client to merge the one or more changes from the server-side instance of the form into a client-side instance of the form.

6. The computer-readable storage medium of claim 5, wherein said sending the form to the client involves using the template to produce the client-specific rendering of the form.

7. The computer-readable storage medium of claim 6, wherein the client-specific rendering of the form includes a return URL, which specifies the network location and points to the application on the server for events to return to.

8. The computer-readable storage medium of claim 6, wherein the server inserts a script into the client-specific rendering of the form and marks the script to be run on the client in response a respective input event on the client.

9. A computer system that facilitates distributed form processing, comprising:

one or more processors;

a memory coupled to the one or more processors and storing program instructions executable by the one or more processors to implement:

a server configured to send a form to a client, wherein the form is consistent with a common object model which is supported by both the client and the server, and wherein the form is based on a template;

wherein the form specifies client logic and server logic including one or more scripts, each executable by either of the server or the client, as well as calls between the client logic and the server logic for invoking or receiving results from the one or more scripts wherein a programmer can generate the client logic and the server logic in a single form using the common object model, instead of having to generate the client logic and the server logic separately using different object models;

wherein each script is marked in the form to be run on the client in response to a respective input event on the client or to be run on the server in response to the respective input event on the client, wherein a client-specific rendering of the form includes a return network location which points to an application on the server for events to return to;

wherein the server is further configured to:

receive an indication from the client of an input event on the client and of associated data, wherein a script of the one or more scripts is marked to run on the server in response to the input event;

in response to said receiving the indication: create a server-side instance of the form according to the common object model, the template, and the associated data;

execute the script based on the server-side instance of the form, wherein executing the script results in one or more changes to the server-side instance of the form; and send to the client an indication of the one or more changes to the form, thereby allowing the client to merge the one or more changes from the server-side instance of the form into a client-side instance of the form.

10. The computer system of claim 9, wherein the server-side instance of the form is stateless.

* * * * *